J. A. SMITH.
GUIDING AND GUARDING MEANS FOR ADDING MACHINES.
APPLICATION FILED MAY 2, 1905.
963,951.
Patented July 12, 1910.
2 SHEETS—SHEET 2.
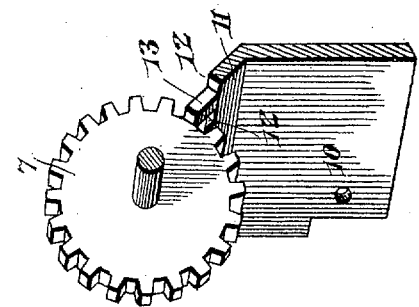
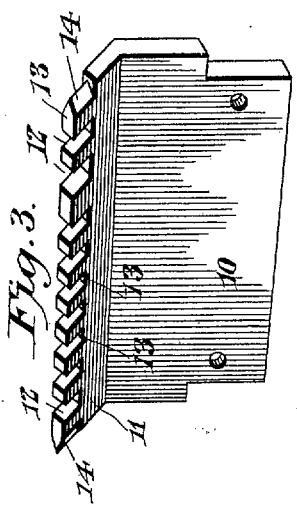
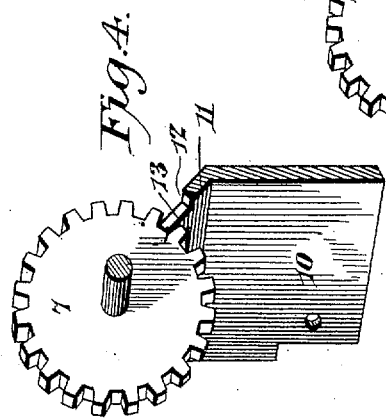
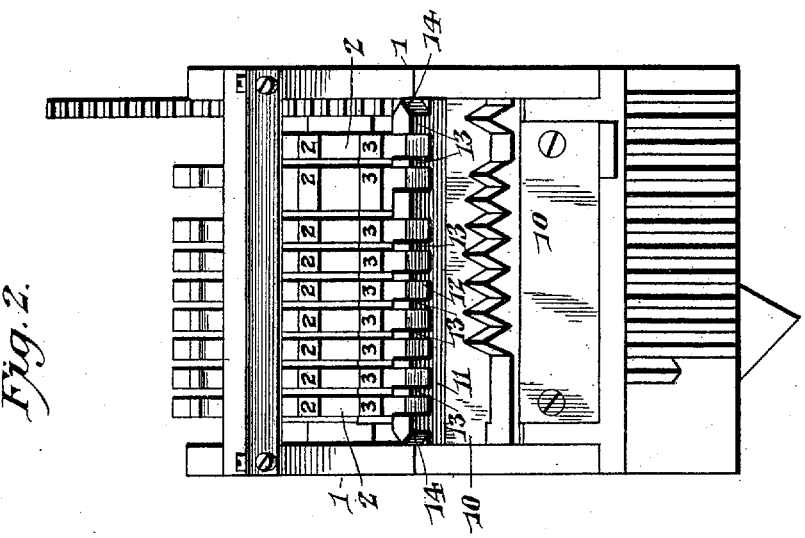
John A. Smith, Inventor
Witnesses
Jack F. McCathran
Louis G. Julihn
By C. G. Siggers
Attorney

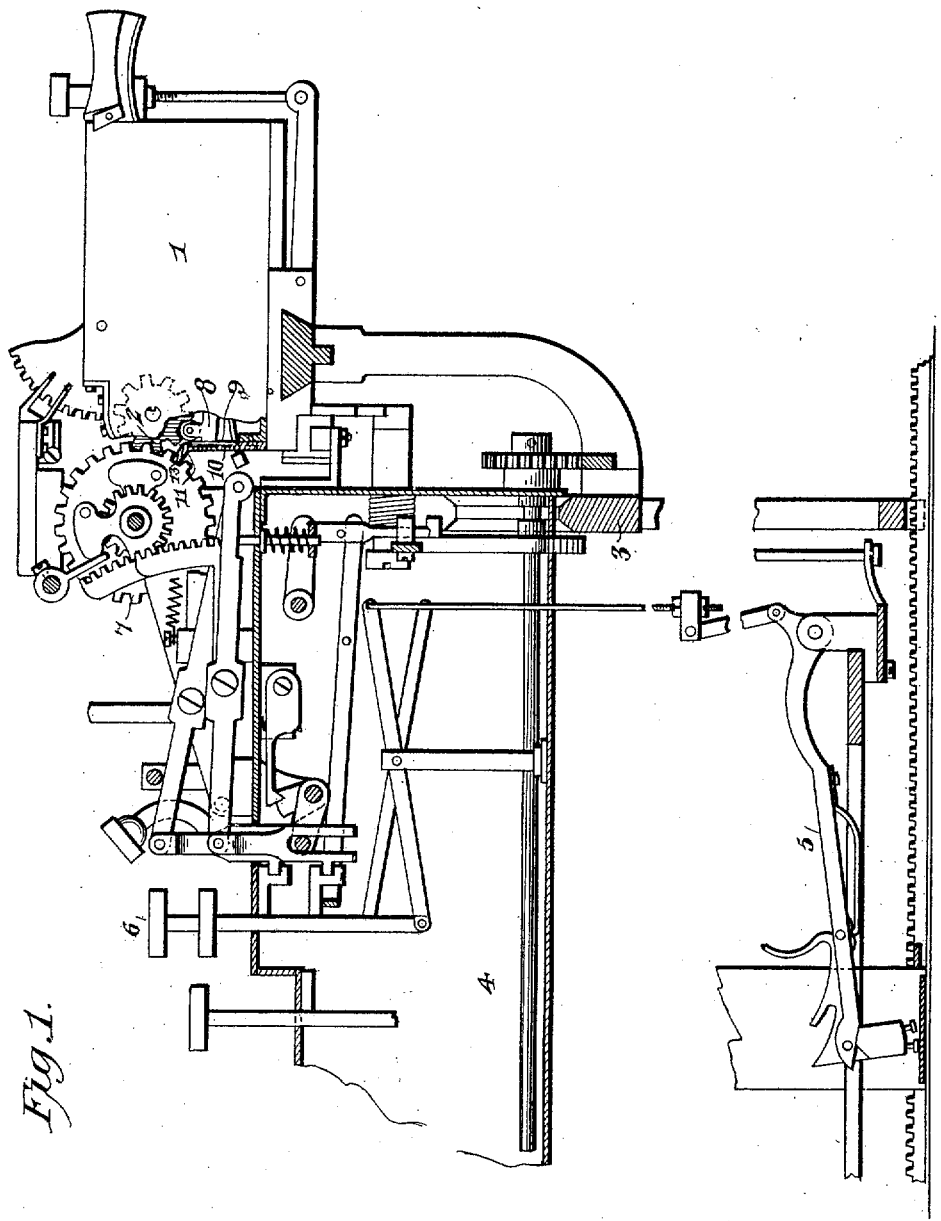

UNITED STATES PATENT OFFICE.

JOHN ASBURY SMITH, OF CLEVELAND, OHIO, ASSIGNOR TO ELLIOTT-FISHER COMPANY, OF NEW YORK, N. Y., A CORPORATION OF DELAWARE.

GUIDING AND GUARDING MEANS FOR ADDING-MACHINES.

963,951. Specification of Letters Patent. Patented July 12, 1910.

Application filed May 2, 1905. Serial No. 258,537.

*To all whom it may concern:*

Be it known that I, JOHN A. SMITH, a citizen of the United States, residing at Cleveland, in the county of Cuyahoga and State of Ohio, have invented a new and useful Guiding and Guarding Means for Adding-Machines, of which the following is a specification.

This invention relates to an improvement in calculating machines, in which a series of number wheels and a master wheel, or their equivalents, are relatively movable in order to bring the master wheel into coöperative relation with the several number wheels in succession.

The object of the invention is to provide means for guiding the master wheel to the number wheels with certainty and for preventing the master wheel from rotating to operate a number wheel during such relative movement of the parts as serves to disconnect the master wheel and the number wheel engaged by it.

To the accomplishment of this object, and others, which will more fully appear, the preferred embodiment of the invention comprehends a plate, located at the front of the casing or frame in which the number wheels are mounted, and having its upper edge bent forwardly and notched to define an alined series of guiding and guarding teeth or projections obstructing lateral movement of the master wheel, unless said projections are opposite an interval between two teeth of the wheel, and resisting rotary movement of the master wheel, unless the latter is spaced directly opposite a number wheel of the register.

The invention also resides in other features of construction to be hereinafter described, illustrated in the accompanying drawings, and finally claimed.

In said drawings—Figure 1 is a sectional elevation of a combined typewriting and adding machine, having my present improvements applied thereto. Fig. 2 is a front elevation of a computing device or register, equipped with a guiding, guarding, and locating plate. Fig. 3 is a detail perspective view of the plate detached. Fig. 4 is a detail perspective view of the master wheel and a portion of the plate, showing the manner in which the projections on the latter prevent the master wheel from rotating, except when the said wheel is directly opposite a number wheel, and Fig. 5 is a view similar to Fig. 4, but showing the parts in those relative positions which permit the rotation of the master wheel.

Each part is designated by its proper reference character in the several views.

The machine comprises in general two essential mechanisms, to-wit, the register or computing device, and the actuating mechanism therefor. The register or computing device 1 includes a series of denominational members or number wheels 2, provided with peripheral teeth, as shown in Fig. 1, and bearing digits on the end faces of said teeth, as shown in Fig. 2. The number wheels correspond in position to the denominational orders of a column and are equipped with suitable carrying mechanism by means of which each wheel, as it completes the final portion of ten increments or units of movement, will impart a single increment or unit of movement to the next adjacent wheel of higher order, to-wit, the adjacent wheel to the left. When, as in the present instance, the computing device 1 is arranged for printing decimal fractions, the second wheel from the right hand end of the series is of double width to accommodate the space for the decimal point, see Fig. 2.

In the particular type of machine which I have selected for illustrative purposes, the register 1 is carried by the main frame 3 of a flat platen or "book" typewriter, the carriage 4 of which travels step-by-step on the frame 3 to letter space the writing, effected by means of type bars 5 operated by keys 6. Certain of the keys operate type bars equipped with numerals, so that the digits which are to be included in the computation may be printed and simultaneously added.

The actuating mechanism for the computing device or register includes a driving member or master wheel 7, toothed, as shown in Fig. 1, to mesh with the driven members or number wheels and mounted on the carriage 4 of the typewriter, so that, as the latter moves step-by-step from order to order of the column, the master wheel, moving therewith in a lateral direction, will be presented to the number wheels in succession. The movement of the carriage 4 merely effects the movement of the master wheel from number wheel to number wheel of the register. The rotary movement of the master wheel necessary to operate the number wheels is effected by means of the numeral keys 6 through intermediate connection which, though shown in Fig. 1 of the drawings, need not be specifically described, since the particular character of connection between the keys and the master wheel constitute no part of my present invention. It may be stated, however, that the master wheel is given a different degree of rotary movement by each of the numeral keys, the "1" key, for instance, imparting a single increment or unit of movement thereto, and the "9" key nine increments or units of movement. Thus, the position of the carriage determines the number wheel to be operated and the particular key depressed determines the extent of movement of the master wheel and thus the amount added upon the number wheel engaged thereby.

Within the casing of the register 1 are mounted a series of locators 8 urged upwardly into engagement with the number wheels to insure the location of the teeth thereof in accurate alinement and thus facilitate the movement of the master wheel from one number wheel to another. The locators 8 are extended forwardly and their front ends are guided in vertical guide grooves or slots 9 in a plate 10 constituting the front wall of the register casing.

The construction and arrangement of parts thus far described is characteristic of the illustrated type of machine, to which, as well as to any similar machine wherein the master wheel and number wheels move laterally relative to each other, certain objections have been urged, which objections the present invention is intended to overcome. The most serious of these objections is the possibility of securing a false computation by the premature depression of a key, which results in rotating the master wheel during its movement from one number wheel to another and before it has become completely disengaged from the wheel previously operated by it and before it has reached its normal completely engaged position opposite the next wheel. This causes the number wheel, out of engagement with which the master wheel is moving, to be moved one or more increments, which falsifies the computation to that extent.

Another objection is the possibility of error arising from the printing of a number in the space appropriated for the decimal point. For instance, if the operator neglects to provide for the decimal space and prints, immediately after the units order, the two numbers which should appear in the tenths and hundredths (tens and cents) orders of the column, both of these numbers will be registered on the tenths wheel, which, as stated, is of double width to accommodate the decimal space.

Another objection bearing a very close analogy to that first mentioned is the possibility of error arising from the actuation of the last number wheel while the master wheel is moving out of engagement with the register. For instance, if a number is printed in the hundredths or cents order and another key is immediately struck for the purpose of printing a number outside of the column, the last number wheel away from which the master wheel is moving, may be rotated.

All of these possibilities of error are obviated and various other desirable results, to be hereafter pointed out, are attained by the simple expedient of providing, at the upper edge of the plate 10, a forwardly and upwardly inclined flange 11 disposed substantially radial to the axis of the master wheel and provided with notches or openings 12 opposite the number wheels and defining intermediate guiding, guarding, and locating teeth 13.

The plate 10, as shown in Fig. 2, extends entirely across the series of number wheels and somewhat beyond the opposite ends thereof. It will be noted that by disposing the flange 11 radially with respect to the master wheel, and by extending it forwardly from the front of the register casing, as shown in Fig. 1, this flange, or at least the toothed portion thereof, will extend inwardly from the periphery of the master wheel. That is to say, the toothed portion of the flange will be so located that when the master wheel is moved by the carriage to a position opposite the register, the flange 11 will be disposed between two teeth of the wheel, provided the position of the master wheel when at rest is such that it may be moved laterally into meshing relation with the number wheels. If, when the master wheel approaches the side of the register casing, said wheel is not in position to permit the reception of the flange 11 between its teeth, the adjustment of the parts its erroneous, and, even in the absence of the flange, the master wheel would not move into meshing relation with the number wheels. The flange therefore serves to indicate whether the register is properly set with relation to the master wheel. If, however, the adjustment is correct, the flange being received between the two teeth of the master wheel, serves to guide the latter into engagement with the register or into meshing relation with anyone of the several number wheels.

By reference to Fig. 2, it will be seen that the notches 12 in the flange 11 are located opposite the number wheels, as heretofore stated, the notch which is located opposite the wheel of double width being only half as wide as the wheel and located opposite the right hand half thereof. Therefore, when the master wheel is arrested directly opposite a notch in the flange, it will be in proper engagement with a number wheel and may be rotated for the purpose of operating the latter. If, however, the master wheel is not in proper position with relation to the number wheels, then, instead of being opposite a notch in the flange, one of the guard teeth 13 will be located between two teeth of the master wheel, and the latter in consequence will be locked against rotary movement. Therefore, if, during the movement of the master wheel from one number wheel to the next, a numeral key is struck, the master wheel, instead of rotating and thus erroneously operating two number wheels at the same time by direct engagement therewith, will be held against rotation by one of the guard teeth until the carriage has completed its movement and presented the master wheel squarely opposite the next number wheel of the series. As soon as this occurs, the master wheel will be opposite a notch in the plate and may rotate under the impulse of a key, the guard being ineffective in this normal relation of the driving and driven elements or wheels. Similarly, if, overlooking the necessity for spacing past the decimal point, the operator should strike a numeral key while the master wheel is opposite the left hand side or half of the wide wheel, a numeral will not be printed in the decimal space, nor will the tenths number wheel be rotated, since such movement will be prevented by the guard. So, also, those portions of the guard which project beyond the opposite ends of the series of number wheels will prevent rotation of the master wheel while moving into engagement with the first wheel of the series, or while moving out of engagement with the last wheel thereof. Attention is also directed to the fact that since the master wheel is provided with an interdental space for each increment or unit of movement thereof, and since the guard may enter any one of these interdental spaces, said guard will be effective to lock the wheel as the latter moves laterally, regardless of the extent to which the wheel has been moved during its previous operation.

In addition to thus preventing the occurrence of error in the computation, the guard, by locking the master wheel, except when in proper position, also prevents the production of an erroneous record, since it will be as impossible to print a numeral at an improper point, that is to say, midway of two denominational positions, or in the decimal space, as it is to actuate the register when the printing point of the carriage is improperly located. Furthermore, these several desirable results are attained without in any way retarding the speed of the operator, because a requisite of a properly printed record is the location of the characters at the proper points, and the guiding and locating device obviously does not obstruct the operation of the machine when it is in proper position to print. On the contrary, the only retardation of the parts which is effected by the device described, is such as is necessary to give the escapement and the carriage propelling mechanism sufficient time to properly space the carriage and any speed in excess of this would be beyond the capability of the machine in any event.

Assuming that the register or computing device has been properly adjusted relative to the master wheel, so that the latter will move freely into and out of mesh with the number wheels, it may be that, after continued use, slight wear of the operating connections would result in a slightly abnormal position of the master wheel when brought to rest after rotary movement. That is to say, the master wheel might come to rest in such position that, when moved laterally to engage the first number wheel of the register, it would not move into mesh therewith with accuracy. I have, therefore, formed the outer side face of the end teeth 13 with inclines, cams or bevels 14. It results from this construction that if the master wheel is slightly out of position when it moves into the register from either end thereof, it will not be arrested by contact with a tooth of the guard, but instead of such stoppage, a tooth of the master wheel engaging one of the inclines, bevels or cams, will move along the same and thus effect such slight rotation of the master wheel as will cause it to assume a proper position with relation to the teeth both of the guard and of the number wheels. It will, therefore, be seen that the device serves not only to guide the master wheel in its lateral movement and to guard the number wheels against improper actuation by the master wheel, but that it also constitutes a locator for the master wheel, since it actually effects such slight adjustment of the latter as may be necessary to cause the master wheel to move into the register with certainty and precision, whether the carriage is being advanced in the direction of letter spacing or retracted.

In conclusion, attention is directed to the fact that since it is a mere relative movement of the computing device and master wheel which is necessary to cause the presentation of the latter to successive number wheels, it is immaterial whether this change of denominational position is effected by lateral movement of the master wheel or of the number wheels, or both, since the guiding, guarding and locating means, with which the present invention is concerned, is equally effective, whether the master wheel moves along the guard or the guard moves bodily with reference to the master wheel, and, in fact, would be equally effective if the change from one denominational position to another were effected by lateral movement of both the master wheel and the number wheels.

It is thought that from the foregoing, the construction, operation and advantages of the invention will be clearly comprehended; but, while the illustrated structure is thought at this time to be preferable, I desire to reserve the right to effect such changes therein or modifications and variations thereof as may come fairly within the scope of the protection prayed.

What I claim is:—

1. In combination, a computing device including a toothed driven element, a toothed driving element meshing therewith, said driving and driven elements being relatively movable in a lateral direction into and out of engagement, means for imparting different degrees of movement to the driving element to effect different degrees of movement of the driven element, and a guard adapted to enter any one of the interdental spaces of one of said elements to lock the engaged element against movement by said moving means during the relative lateral movement of the driving and driven elements into or out of engagement, said guard being ineffective to lock either of said elements when the latter are in normal coöperative position.

2. In a computing device, a series of denominational members, a master means normally engaging one only of the denominational members, said members and the master means being relatively movable in a lateral direction and said master means engaging two denominational members during such movement, means preventing the operation of the master means while the latter is in engagement with more than one denominational member and ineffective to prevent the operation of the master means when the latter is in normal engagement with a single denominational member, and means serving to insure the accurate location of the master means in position to properly engage a denominational member.

3. In combination, computing mechanism including a series of wheels, a guard including a series of projections, and a master wheel engaging the wheels and projections alternately.

4. In combination, computing mechanism including an alined series of wheels, an alined series of guarding and guiding projections alternating with the wheels, and a laterally movable toothed master wheel arranged to receive the projections between its teeth, whereby said master wheel is guided by the projections during its movement into and out of mesh with the wheels of the computing mechanism and is locked against rotation during such movement.

5. In combination, a register casing, computing mechanism therein including a series of wheels, a guard plate located at the front of the casing and formed with a series of projections spaced apart, and a master wheel adapted to mesh with and rotate the first named wheels when opposite the spaces of the guard plate and to be engaged with and locked against rotary movement by the projections of said plate when moving from one space to another.

6. In combination, a register casing, computing mechanism therein including a series of wheels and locators therefor, a plate closing the front of the casing and formed with locator guides, a series of teeth or projections extending at an angle from the upper edge of the plate, and a laterally movable master wheel arranged to mesh with and operate the wheels of the computing device and to be locked against rotary movement and guided by the teeth or projections during the movement of the master wheel into and out of engagement with the wheels first named.

7. In combination, a movable carriage, printing mechanism including a series of keys, a computing device coöperatively related to the keys and means for locking said keys during certain movements of the carriage to prevent premature printing of a character or premature operation of the computing device.

8. In combination, a typewriting machine including a carriage movable step-by-step for letter spacing, printing mechanism including a series of keys controlling the movement of the carriage, a computing device arranged to be operated upon the depression of a key and means for preventing depression of any of said keys during the letter spacing movements of the carriage.

9. In combination, a computing device including a series of number wheels, a laterally movable master wheel adapted to mesh with successive number wheels, and a guiding guarding and locating plate having a notched edge extended between the teeth of the master wheel, said notches being opposite the number wheels and of sufficient width to accommodate the master wheel.

10. In combination, a series of number wheels one of which is of double width to accommodate the decimal space, a master wheel arranged to engage and operate the number wheels, and a guard associated with the wide number wheel and disposed to lock the master wheel against rotation when the latter is opposite the decimal space.

11. In combination, a series of toothed wheels, a toothed master means for operating the wheels, said wheels and master means having relative lateral movement, and locating means adapted to engage the master means to properly position or locate the latter and thus facilitate the engagement of the wheels by the master means.

12. In combination, a series of toothed wheels, a toothed master wheel adapted to mesh with the wheels first named, and a cam disposed by engagement with a tooth of the master wheel to insure the accurate location of the latter in position to mesh with the wheels first named.

13. In combination, a series of number wheels, an alined series of guarding and guiding projections associated therewith, and a master wheel movable laterally to engage the first named wheels, the end teeth or projections of the series being beveled to engage the teeth of the master wheel and to properly locate said wheel in order to cause the latter to move into mesh with the first named wheels with certainty and precision.

14. The combination with a computing device including a series of toothed driven elements, of a toothed driving element adapted to mesh therewith, said computing device and the driving element being relatively movable in a lateral direction to establish an operative relation between the driving element and successive driven elements, and a guard adapted to enter any one of the interdental spaces of the driving element to lock the same against rotary movement during the relative lateral movement of the driving and driven elements.

15. In a computing device, a series of denominational members, a master means normally engaging one only of the denominational members, said members and the master means being relatively movable in a lateral direction and said master means engaging two denominational members during such movement, and means preventing the operation of the master means while the latter is in engagement with more than one denominational member and ineffective to prevent the operation of the master means when the latter is in normal engagement with a single denominational member.

16. In combination, a series of toothed wheels, a toothed master means for operating said wheels, said wheels and master means having a relatively lateral movement, and a series of guiding devices alternating with said toothed wheels and adapted to engage the master means during said lateral movement and thus facilitate and insure the engagement of the wheels by the master means.

17. In a combined writing and computing machine, the combination of printing means and a paper carrier, a series of denominational members and a master means that rotates always in the same direction, the printing means and the paper carrier having a relative lateral movement to space the printing and to cause a relative lateral movement between the denominational members and the master means, and means to alternately lock and unlock the master means during such lateral movements.

18. In a combined writing and computing machine, the combination of printing means and a paper carrier, a series of denominational members and a master means that rotates always in the same direction, the printing means and the paper carrier having a relative lateral movement to space the printing and to cause a relative lateral movement between the denominational members and the master means, and means to lock the master means from operating when not properly positioned to engage a denominational member.

19. In a computing device, the combination of a series of toothed denominational members and a toothed master member, said denominational member and said master member having a relative lateral movement, and means alternating with said denominational members adapted to engage the teeth only of said master member to prevent the operation of said master member during such relative lateral movement.

20. In a computing device, the combination of a series of denominational members and a master means, said master means and denominational members having a relative lateral movement, and means for preventing the operation of the master means during the time when it is in partial engagement with one of the denominational members, but ineffective to prevent its operation when it is in full engagement with one of said denominational members.

21. In a computing device, the combination with a series of denominational members and a master means for operating said denominational members, said master means and denominational members having a relative lateral movement, of a series of numeral keys for operating said master means, and means for preventing the complete operation of said keys during all of the time when said master means is out of full engagement with one of the denominational members but ineffective to prevent their operation when said master means is in full engagement with one of said denominational members.

22. In a combined typewriting and adding machine, the combination with a paper carrier and printing instrumentalities of keys including numeral keys for actuating said printing instrumentalities, means whereby said keys when operated cause a relative lateral movement between the printing instrumentalities and the paper carrier, a series of denominational members, a master means, said denominational members and master means having a relative lateral movement in unison with the relative lateral movement of the printing instrumentalities and the paper carrier, whereby the master means is brought into engagement with one after another of said denominational members, and means for preventing an operation of one of said denominational members by said master means to accumulate a digit during the time when said master means is passing out of engagement with said denominational member.

23. The combination with a computing device including a series of denominational members and a master actuator, said computing device and actuator being relatively movable in a lateral direction to change the denominational relation thereof, of a series of keys arranged to operate the actuator, connections intermediate of the keys and actuator whereby the locking of the actuator will lock the keys, and means coacting with the actuator to lock the same during the relative lateral movement of the computing device and actuator.

In testimony, that I claim the foregoing as my own, I have hereto affixed my signature in the presence of two witnesses.

JOHN ASBURY SMITH.

Witnesses:
W. T. McELROY,
ARTHUR COWDREY.